United States Patent Office 3,334,378
Patented Aug. 8, 1967

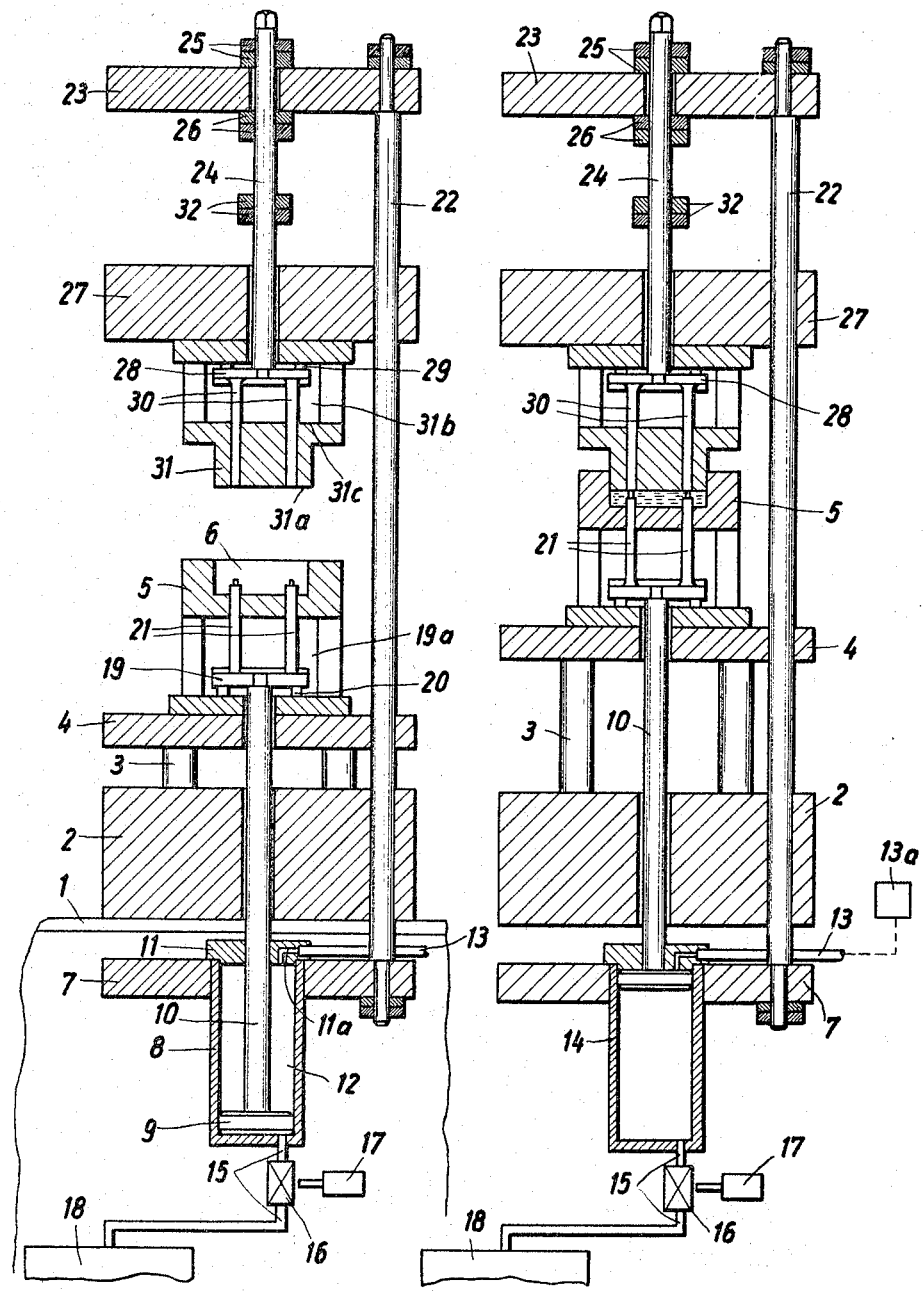

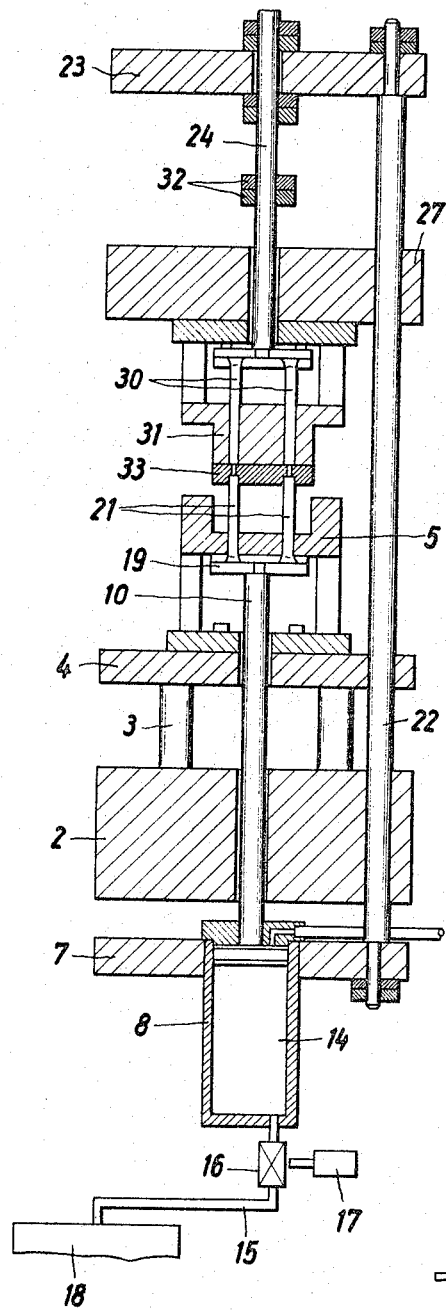
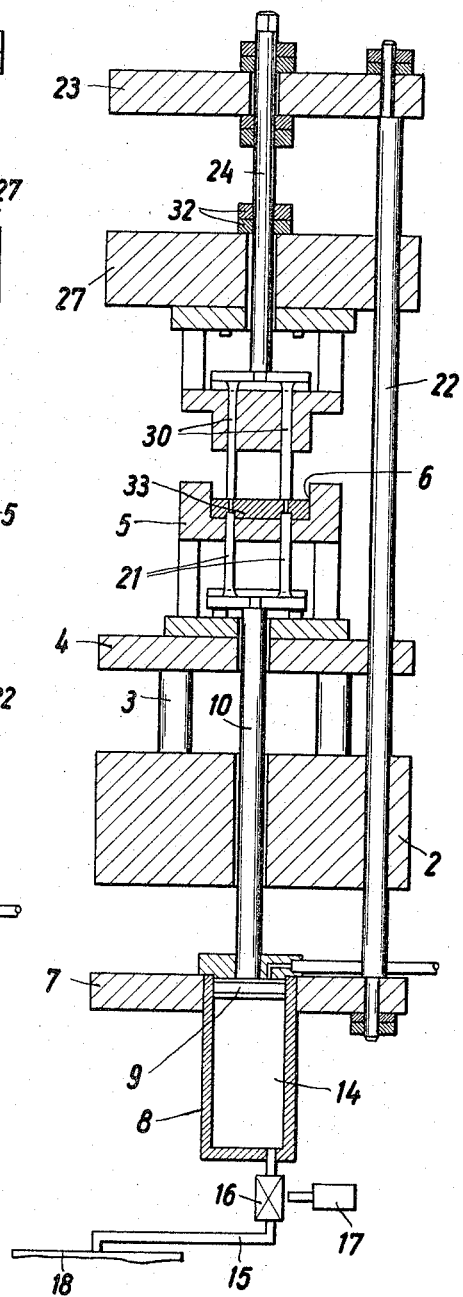
Fig. 3                    Fig. 4
Inventors:
Donat Scherrer-Wirz
& Karl Wenzel
By Werner W. Kleeman
Their Attorney

3,334,378
APPARATUS FOR EJECTING AND REMOVING MOLDED ARTICLES FROM PRESSES
Donat Scherrer-Wirz, Thayngen, Switzerland, and Karl Wenzel, Ettenheim, Kreis Lahr, Germany, assignors to Maschinenfabrik Fahr A.G., Gottmadingen, Kreis Constance, Germany
Original application Jan. 18, 1963, Ser. No. 252,343. Divided and this application Aug. 12, 1964, Ser. No. 389,067
14 Claims. (Cl. 18—2)

ABSTRACT OF THE DISCLOSURE

An article forming machine including a tool member having relatively movable tool portions, at least one of which is provided with a cavity therein. The tool portions when brought together provide an enclosed space in which an article is formed. Each of the tool portions has, movable relative thereto, an ejector means that engages a face of the article and effects the separation of the article from its associated tool portion when the tool portions are separated from each other and from the article. The ejector means are interconnected in such a manner that both remain in supporting engagement with the formed article after the tool portions have been completely separated therefrom.

---

The present invention has reference to an improved apparatus for ejecting and removing molded articles or blanks formed of plastic and metal from pressing machines, injection molding machines, die-casting machines and pressure casting machines, of the type provided with movable and hydraulically controlled ejectors imbedded in the top-half mold and the bottom-half mold. The present application is a division of my co-pending United States application, Ser. No. 252,343 filed Jan. 18, 1963, now abandoned.

Presses are already known to the art in which the ejectors are movably guided and hydraulically controlled in the bottom-half mold as well as also in the top-half mold. In such presses it oftentimes occurs that the molded articles remain suspended on the top-half mold, and upon actuating the upper ejector then fall into the machine frame. Disturbances or malfunctions of this type render it impossible to provide for a completely automatic operation, since an automatic receiver or collector is not able to grasp the molded article which has fallen from the upper ejectors. A result of such type of operation is that the machine must be brought to standstill for long periods of time and the molded articles are damaged. Additionally, the hydraulic control of the ejectors is complicated and readily susceptible to disturbances, so that further periods of lost time result.

Accordingly, it is one of the primary objects of the present invention to provide an ejector actuation by means of which the pressed or extruded molded articles are held in such a manner that a dropping of the molded articles and a disruption of the fully automatic operation of the press can no longer occur.

The aforementioned object is achieved in accordance with the present invention in that, upon opening the tool members upper and lower ejector means contact the molded article, and during the opening operation their position relative to one another does not change or materially change, and thereby they hold the molded article between them. In accordance with the invention and for carrying out this mode of operation there is employed an apparatus in which the one lower ejector rod is provided with a piston which is guidable in a cylinder mounted in a lower ejector bridge or crossbar. Advantageously, the lower ejector bridge is connected via a column or standard of constant length with the upper ejector bridge, to which the one upper ejector rod is rigidly connected.

In a further constructional manifestation or detail of the invention, the lower and upper ejectors are connectable with the respective ejector rods and are provided with clearance in the lower and upper tool members. Advantageously, the movable tool or mold carrier plate entrains or carries along the lower ejector rod via stop means and an ejector plate, whereby the piston in the cylinder is pulled upwardly. The lower cylinder compartment or chamber advantageously communicates with an oil reservoir through the agency of a pipe conduit and a relief or check valve. The upper cylinder chamber or compartment is connected to an accumulator by means of a pressure line. The relief valve connected beneath the lower cylinder compartment is advantageously controlled via a magnetic switch.

In accordance with a further feature of the present invention the path of movement of the upper ejector rod and, therewith, also the path of movement of the lower ejector bridge can be limited by adjusting nuts and stop members provided in the tool member. Advantageously, the collector or receiver provided for removing the molded articles is constructed to be box-shaped, and during the removal operation engages about the molded article at all sides. According to the invention the box-shaped collector actuates a contact by means of which the relief valve is opened, so that the piston is returned by a medium which is under pressure and which is supplied from the accumulator, until the lower ejector abuts against the stop members. When the ejector rests against the stop member the flowing medium raises the cylinder, whereby the upper ejector is actuated.

Another important object of the present invention is to provide an improved arrangement for ejecting and collecting articles from presses in a very reliable manner, readily capable of stripping the article from the tool members or molds in a positive manner.

Still a further important object of the present invention is to provide an improved control for the ejectors of presses capable of effectively stripping the formed article from the press, even if such should become caught in an upper or lower tool portion.

Yet a further important object of the invention is to provide an improved apparatus for removing and collecting articles formed in presses which is relatively simple in construction, highly reliable in operation, requires a minimum of attention, and provides for an automatic or as fully automatic operation of a press as is reasonably possible.

Another important object of the present invention is to provide improved means for ejecting and removing articles from presses, maintaining said articles in seized condition when the press is opened, to thereby prevent inadvertent release thereof.

These and still further objects and the entire scope of applicability of the present invention will become apparent from the detailed description given hereinafter; it should be understood, however, that the detailed description and specific example, while indicating a preferred embodiment of the invention, is given by way of illustration only, since various changes and modifications within the spirit and scope of the invention will become apparent to those skilled in the art from this detailed description.

In the drawings:

FIGURE 1 illustrates a press in open position with retracted ejectors;

FIGURE 2 illustrates the press in closed position with the ejectors disposed in a mold filled with molding powder and in withdrawn or retracted position;

FIGURE 3 illustrates a half-open press with a molded article suspended from the upper portion of the mold;

FIGURE 4 illustrates a half-open press with a molded article suspended at the lower part of the mold;

Figures 5, 6:
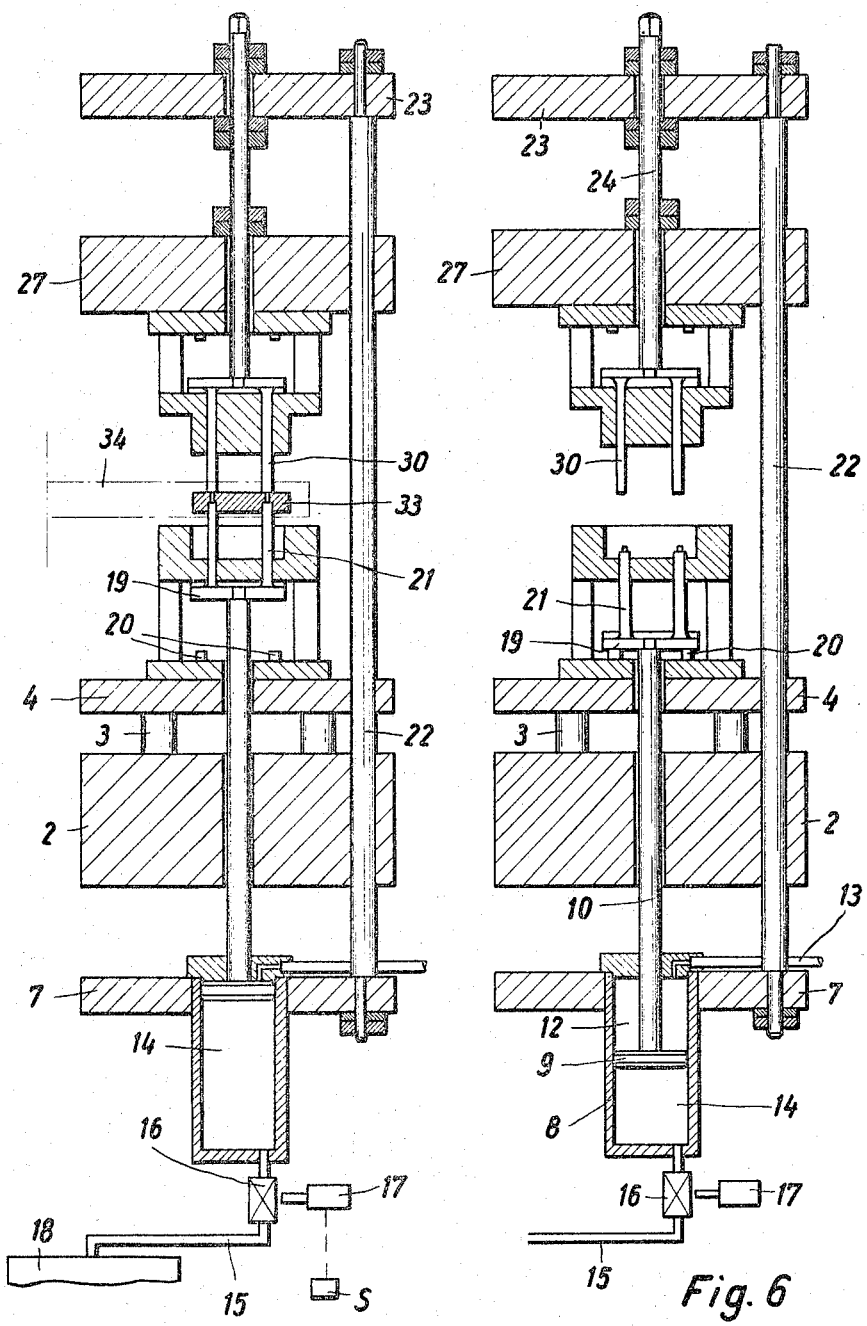
FIGURE 5 illustrates an open press with extended ejectors and a molded article supported therebetween.
FIGURE 6 illustrates an open press with the molded article removed and with the lower ejectors in their retracted position.

Referring now to the drawings, it will be recognized that a cylinder block 2 is rigidly mounted on a press-frame 1. In the cylinder block 2 there are located off-center arranged pressure pistons 3 adapted to move a displaceable tool carrier plate or support 4. A tool member or bottom half-mold 5 provided with a mold cavity 6 is disposed on the tool carrier plate 4. A lower ejector bridge or crossbar 7 is mounted on the press frame 1 beneath the cylinder block 2 to be vertically displaceable. The ejector bridge 7 carries a cylinder 8 in which there is disposed a piston member 9, said piston member being provided with an upwardly extending, lower ejector rod 10.

The cylinder 8 is closed by a cover member 11 and is suitably sealed with respect to the externally extending portion of the ejector rod 10. A bore or channel 11a is provided in the cover member 11 which communicates or opens into the upper pressure chamber or compartment 12, as shown in FIGURE 1. A pressure conduit or pipe 13 is connected with the channel 11a and leads, in turn, to a suitable pressure source 13a (see FIGURE 2). At the base of the cylinder 8 and in the lower cylinder compartment 14 (see FIGURE 2) there is connected a suction line or conduit 15 in which there is arranged a check or relief valve 16. For controlling the relief valve 16 there is connected directly adjacent thereto a magnetic switch 17. The suction conduit 15 communicates with an oil reservoir 18.

The lower ejector rod 10 is connected at its upper end with an ejector plate 19 provided with two or more movement-limiting stop members 20. In the embodiment illustrated, the ejector members 21 connected to the ejector plate 19 extend into the mold cavity or space 6, and at the same time form mold contours. A free space or compartment 19a is located between the stop members 20 and the tool member 5, in which the ejector members 21 are able to move.

A column or support member 22 is mounted to the lower ejector bridge 7 and serves to actuate the upper ejector bridge 23. An upper ejector rod 24 is connected to the upper ejector bridge 23 by means of adjusting nuts 25 and 26, by way of example. The ejector rod 24 piercingly extends through a stationary tool carrier plate member 27. At the lower end of the ejector rod 24 there is operatively connected the upper ejector plate 28. The upper ejector plate 28 is limited in its uppermost position by stop members 29.

Upper ejector members 30 are connected to the upper ejector plate 28, said ejector members 30 terminating at, or being at their edges coplanar with, the lower edge or face 31a of the upper half-mold or tool member, here shown as a tool punch 31. The ejector members 30 are able to move in the interspace or compartment 31b between the stop members 29 and the upper face 31c of the tool punch 31. Moreover, this movement is further limited by the adjusting nuts 32. The molded article or blank, as for example illustrated in FIGURES 3–5, has been generally designated by reference numeral 33.

The operation of the aforedescribed press is as follows: In FIGURE 1 the press is illustrated in its open position. The ejector members 21 and 30 are located in the tool members 5 and 31, respectively, in their retracted position. The piston member 9 is situated in the lowermost position in the cylinder member 8 (see FIGURE 1). In the upper pressure chamber 12 there is located a fluid medium which is under a pressure of approximately 15 atmospheres absolute pressure. If a molding powder is now deposited in the mold cavity or space 6 by means of a suitable supply device (not shown), then a non-illustrated contact switch or the like effectuates closing of the press. The pressure pistons 3 displace the movable tool carrier plate 4 into its closed position, in a manner best seen by reference to FIGURE 2. As a result, the ejector plate 19 vertically carries, in the upward direction, the lower ejector rod 10 connected to said ejector plate 19 together with the piston member 9 located on said lower ejector rod 10.

The piston member 9 thereby forces the pressure medium located in the upper pressure chamber 12 through the pressure conduit 13 back into the accumulator or power storage device, generally designated by reference numeral 13a in FIGURE 2. At the same time oil is sucked or withdrawn from the oil reservoir 18 through the suction line 15 into the lower cylinder compartment 14 beneath the piston member 9. The check valve 16 prevents a return flow of such oil back into the oil reservoir 18. In this position there occurs a pre-pressing, airing and re-pressing of the moldable material. The ejector members 21, 31 are still in retracted position. If the required standing time has terminated, then a non-illustrated contact switch or the like opens the press.

In FIGURE 3 the press is illustrated in half-open position. However, the molded article or blank 33 has become caught in the upper tool member 31. The displaceable tool carrier plate 4 moves downwardly. The tips of the ejector members 21 and 30 securely hold the molded article 33. The tool member 5 abuts against the ejector plate 19, then the lower ejector rod 10 is pressed downwardly. Since the check valve 16 is still closed, the lower ejector bridge 7 and cylinder 8 move downwardly and at the same time carry along therewith the column member 22. As a result, the upper ejector bridge 23, upper ejector rod 24 and the ejectors 30 are moved downwardly, until the press assumes the position according to FIGURE 5 and the stop member 32 limits movement. The molded article is, however, still located between the tips of the ejector members 21 and 30.

In FIGURE 4 there is illustrated the press in a condition where the molded article 33 has become caught in the mold cavity 6. The press is illustrated in half-open position. The rigidly held molded article 33 imparts such a resistance to the ejectors 21 that, the lower ejector rod 10 is carried along during the opening movement of the displaceable tool carrier plate 4. The locked piston member 9 presses the lower ejector bridge 7 together with the cylinder 8 and the column 22 in downward direction, and thereby carries along the upper ejector bridge 23. The upper ejector rod 24 connected with the upper ejector bridge 23 is pressed in a downward direction, until the adjusting nuts or stops 32 come to rest against the stationary tool carrier plate 27. As a result, the movable system is blocked and the molded article 33 is pressed out of the mold cavity 6 during a further opening operation. Also in this possible mode of operation, the molded article 33 remains between the tips of the ejectors 21 and 30.

If the displaceable tool carrier plate 4 has reached its lowermost position in the press, then the molded article 33 is again freely located between the tool members 5 and 31, and as shown in FIGURE 5 is securely held by the ejector members 21 and 30. At this moment there appears from the side of the press, a box-shaped collector 34, shown in phantom in FIGURE 5, and encompasses or surrounds the molded article 33. At the same time, the collector 34 triggers a suitable contact S (see FIGURE 5), so that the magnetic switch 17 controls the check valve 16. The oil located in the lower cylinder chamber 14 flows back to the oil reservoir 18 and the piston 9 lowers in the cylinder 8, until the ejector plate 19 abuts the stop members 20, in a manner shown in FIGURE 6. The movement of the lower ejector rod 10 is thereby limited. The medium flowing from the power storage device or accumulator 13a and out of the pressure conduit 13 now presses the cylinder 8 in an upward direction and, thereby, also the column 22, upper ejector bridge 23, upper ejector rod 24 and the upper ejectors 30. This movement occurs until the piston member 9 abuts against the floor of the cylinder 8, and thereby again assumes the position according to FIGURE 1. The aforedescribed mode of operation then repeats.

Naturally, the apparatus according to the invention can also be employed in conjunction with horizontally arranged press machines. Likewise, it will be apparent, that the drive for the movable mold carrier plate can also be disposed above the press. It will be understood and appreciated that the principles of the present invention are not in any way limited to the illustrated embodiment, which has been shown in the drawings merely by way of example, and not by way of limitation.

What is claimed is:

1. Apparatus for ejecting formed articles from pressing machines, injection molding machines, die-casting machines, pressure casting machines and the like, comprising a tool member including relatively movable first and second tool portions, means for opening and closing said relatively movable first and second tool portions, said tool member being provided with at least one article forming cavity, first ejector means engageable with an article formed in said cavity and cooperating with said first tool portion, second ejector means engageable with said article formed in said cavity and cooperating with said second tool portion, and means operatively interconnecting said first and second ejector means with one another for maintaining the engaged position of said first and second ejector means with the article during opening of said tool member to effect complete stripping of the article from the first and second tool portions.

2. Apparatus for ejecting formed articles from pressing machines, injection molding machines, die-casting machines, pressure casting machines and the like according to claim 1; wherein said first ejector means includes a first ejector rod and a first ejector bridge, said interconnecting means for said first and second ejector means including a movable cylinder, a piston member movably guided in said cylinder and connected with said first ejector rod, said first ejector bridge movably supporting said cylinder.

3. Apparatus for ejecting formed articles from pressing machines, injection molding machines, die-casting machines, pressure casting machines and the like according to claim 2; wherein said second ejector means includes a second ejector rod and a second ejector bridge, said interconnecting means further including a constant length column member connected to said first and second bridges.

4. Apparatus for ejecting formed articles from pressing machines, injection molding machines, die-casting machines, pressure casting machines and the like according to claim 3; wherein said first and second ejector means extend with clearance through said first and second tool portions, respectively.

5. Apparatus for ejecting formed articles from pressing machines, injection molding machines, die-casting machines, pressure casting machines and the like according to claim 2; wherein said means for opening and closing said relatively movable first and second tool portions includes a displaceable tool carrier plate cooperating with said first ejector rod, said first ejector means including a first ejector plate, stop means for said first ejector plate engageable with said first tool portion, said tool carrier plate displacing said piston member in a first direction within said cylinder when said stop means engage said first tool portion to move said first ejector means in said first direction corresponding to its article-ejection direction.

6. Apparatus for ejecting formed articles from pressing machines, injection molding machines, die-casting machines, pressure casting machines and the like according to claim 5; including means for supplying a fluid medium to one face of said piston member directed away from said first ejector means.

7. Apparatus for ejecting formed articles from pressing machines, injection molding machines, die-casting machines, pressure casting machines and the like according to claim 6; wherein said fluid medium supplying means comprises an oil reservoir, a conduit connecting said oil reservoir to said cylinder, and a check valve cooperating with said conduit and opening in the direction of flow towards said cylinder.

8. Apparatus for ejecting formed articles from pressing machines, injection molding machines, die-casting machines, pressure casting machines and the like according to claim 7; including a magnetic switch for controlling said check valve.

9. Apparatus for ejecting formed articles from pressing machines, injection molding machines, die-casting machines, pressure casting machines and the like according to claim 7; including means for supplying a pressurized medium to the face of said piston member facing said first ejector means.

10. Apparatus for ejecting formed articles from pressing machines, injection molding machines, die-casting machines, pressure casting machines and the like according to claim 9; wherein said pressurized medium supplying means comprises an accumulator, and a pressure conduit connecting said accumulator to said cylinder.

11. Apparatus for ejecting formed articles from pressing machines, injection molding machines, die-casting machines, pressure casting machines and the like according to claim 10; including means for removing said article when engaged by said first and second ejector means and when said tool member is open.

12. Apparatus for ejecting formed articles from pressing machines, injection molding machines, die-casting machines, pressure casting machines and the like according to claim 11; including a contact member for opening said check valve when said removing means assumes its article-removing position, whereby said piston member is displaced in a second direction until said first ejector plate abuts against its associated stop means.

13. Apparatus for ejecting formed articles from pressing machines, injection molding machines, die-casting machines, pressure casting machines and the like according to claim 12; wherein said stop means for said first ejector plate are arranged such that when said first ejector plate contacts said stop means, said piston member can no longer be displaced in said second direction and said accumulator then supplies said pressurized medium to said cylinder, whereby said movable cylinder is displaced in said first direction to thereby actuate said second ejector means.

14. Apparatus for ejecting formed articles from pressing machines, injection molding machines, die-casting machines, pressure casting machines and the like, comprising a tool member including relatively movable first and second tool portions, means for opening and closing said relatively movable first and second tool portions, said tool portions being provided with at least one article forming cavity, first ejector means engageable with an article formed in said cavity and cooperating with said first tool portion, second ejector means engageable with said article formed in said cavity and cooperating with said second tool portion, and means operatively interconnecting said first and second ejector means with one another for maintaining the engaged position of said first and second ejector means with the article during opening of said tool member to effect complete stripping of the article from the first and second tool portions, said first ejector means includes a first ejector rod and a first ejector bridge, said interconnecting means for said first and second ejector means including a movable cylinder, a piston member movably guided in said cylinder and connected with said first ejector rod, said first ejector bridge movably supporting said cylinder, said second ejector means includes a second ejector rod and a second ejector bridge, said interconnecting means further including a constant length column member connected to said first and second bridges, and means for limiting the extent of movement of said second ejector rod and therewith also said first ejector bridge.

References Cited

UNITED STATES PATENTS

| 2,358,353 | 9/1944 | Stacy | 18—16 |
| 2,371,195 | 3/1945 | Strauss. | |
| 2,582,891 | 1/1952 | Strauss | 18—2 XR |
| 2,671,247 | 3/1954 | Lester | 18—30 |
| 2,828,507 | 4/1958 | Strauss | 18—2 XR |
| 2,923,973 | 2/1960 | Ninneman | 18—16 |
| 2,923,976 | 2/1960 | Strauss | 18—2 XR |

J. SPENCER OVERHOLSER, *Primary Examiner.*

J. HOWARD FLINT, JR., *Examiner.*